(12) United States Patent
Yoshizawa

(10) Patent No.: US 7,840,621 B2
(45) Date of Patent: Nov. 23, 2010

(54) ELECTRONIC APPARATUS AND ITS CONTROL PROGRAM

(75) Inventor: Hiroaki Yoshizawa, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 1216 days.

(21) Appl. No.: 11/441,947

(22) Filed: May 26, 2006

(65) Prior Publication Data

US 2007/0050432 A1 Mar. 1, 2007

(30) Foreign Application Priority Data

May 31, 2005 (JP) ............................... 2005-160644

(51) Int. Cl.
*G06F 15/02* (2006.01)
(52) U.S. Cl. ...................................... 708/130
(58) Field of Classification Search .................. 708/130
See application file for complete search history.

(56) References Cited

U.S. PATENT DOCUMENTS

| | | | |
|---|---|---|---|
| 7,065,006 B2 * | 6/2006 | Ciervo | 368/223 |
| 2002/0116382 A1 | 8/2002 | Koyama et al. | |
| 2006/0142917 A1 * | 6/2006 | Goudy | 701/45 |

FOREIGN PATENT DOCUMENTS

| | | |
|---|---|---|
| CN | 1371059 A | 9/2002 |
| CN | 1578368 A | 2/2005 |
| JP | 2000-010932 A | 1/2000 |
| JP | 2003-259460 A | 9/2003 |
| JP | 2004-227479 A | 8/2004 |
| JP | 2005-31239 A | 2/2005 |
| WO | WO 2004/073305 A1 | 8/2004 |

OTHER PUBLICATIONS

Chinese Office Action (and English translation thereof) dated Mar. 28, 2008, issued in a counterpart Chinese Application.
Japanese Office Action dated Nov. 4, 2009 (3 pages), and English translation thereof (4 pages), issued in counterpart Japanese Application Serial No. 2005-160644.

* cited by examiner

*Primary Examiner*—Tan V Mai
(74) *Attorney, Agent, or Firm*—Holtz, Holtz, Goodman & Chick, PC

(57) ABSTRACT

In an electronic apparatus having multiple functions such as a scientific electronic calculator, some of the multiple functions are set to be disabled according to need. Function disabling information (protection data) including disabled applications, protect display screen and protection period is stored on a memory card. When the memory card installed in a card slot of the electronic apparatus is detected, the function disabling information is read out and transferred onto corresponding memory areas of a system area in a flash ROM of the apparatus, and a protection display screen is displayed on a display unit, indicating that some of the multiple functions are disabled. Then, only "EXE" key operation is accepted and the function corresponding to the disabled application is disabled, and a function selecting menu screen is displayed, in which a start-up disabled mark M is added to an icon of the disabled application and a protection remaining time T is added.

20 Claims, 12 Drawing Sheets

| 13p — PROTECTION-CARD DISCRIMINATING DATA | PROTECTED APPLICATION — 13a |
|---|---|
| 13b — PROTECTION DISPLAYING SCREEN | PROTECTION PERIOD — 13c |

| 17a₁ — PROTECTED APPLICATION | PROTECTION DISPLAYING SCREEN — 17a₂ |
|---|---|
| 17a₃ — PROTECTION PERIOD | PROTECTION FLAG — 17a₄ |
| 17a₅ — TIMER | |

_US 7,840,621 B2_

ELECTRONIC APPARATUS AND ITS CONTROL PROGRAM

BACKGROUND OF THE INVENTION

1. Field of the Invention

The present invention relates to an electronic apparatus having multiple functions such as a compact electronic calculator having a functional calculus function and program calculus function, and to its control program.

2. Description of the Related Art

Compact electronic calculators such as so-called functional/programmable palmtop calculators are provided with a number of functions, including a functional/graphic calculus function, mathematical-table calculus function, equation calculus function, electronic-information utilizing function for storing and/or reproducing desired data, and a program calculus function for effecting calculations in accordance with arbitrarily written programs, in addition to a basic four arithmetic operation, matrix operation function. A user of such electronic calculator can select a function according to his or her need on its function-selecting menu screen, and use the same.

In general, in classrooms of high schools and/or colleges, static calculations, calculuses, and their applications are given in achievement tests, but the students are prohibited to use the electronic calculator to get the solutions. Meanwhile, the students are allowed to use only an electronic calculator which is provided with only the four arithmetic operation function.

Meantime, in the field of education, some students are recommended to purchase and use without hesitation a compact electronic calculator provided with multiple functions in the classroom, but there is an inconsistency today that although many students possess the electronic calculators but they are not allowed to use their calculators during an examination time.

To solve the inconsistency under the circumstances, some calculators provided with multiple functions are proposed, which are arranged to disable some of the functions according to need and to indicate or disclose the disabled functions to every one.

The proposed calculator is used together with a cap or cover for releasing a disabled-function, which is prepared and is detachably mounted on the top of the calculator body. When the cap is mounted on the top of the calculator body, the calculator is brought to an all function released mode or all function available mode, and the user is informed by a message printed on the cap that all the functions are released and available, and the calculator is kept for a normal use. The calculator with the cap removed is brought to a function disabled mode, where only the basic calculation function of the calculator is available. On the contrary, when the cap is removed from the calculator body, and a message of "function disabled" or "available at examination" printed on the calculator body is exposed clearly, and the user cannot use some functions, since such disabled functions are not released without the cap for releasing the disabled functions.

In the above conventional calculator, the cap is used to switch the function disabled mode to the function released mode or vice verse, the cap has to be prepared separately from the electronic calculator previously, resulting in increase of the number of the parts to be combined, and also increase in manufacturing costs. Further, it is rather troublesome for the user to use both the calculator and the cap. In addition, the functions to be disabled are limited since they have to be determined previously when such cap is prepared.

The present invention has been made to solve the problems caused in the conventional electronic calculators, and has on object to provide an electronic calculator provided with multiple functions, in which some of the functions to be disabled can previously be selected and disabled by the user, and to provide a program used in the calculator.

SUMMARY OF THE INVENTION

According to one aspect of the invention, there is provided an electronic apparatus having multiple functions, which comprises a recording medium receiving unit for receiving a recording medium, function disabling information being recorded on the recording medium, a reading unit for reading out the function disabling information from the recording medium received in the recording medium receiving unit, and a function disabling unit for disabling a function out of the multiple functions on the basis of the function disabling information read out by the reading unit.

According to another aspect of the invention, in the above electronic apparatus, the function disabling information recorded on the recording medium includes time information for defining a time during which a function is kept disabled, and the function disabling unit disables a function out of the multiple functions during a time defined by the time information included in the function disabling information read out by the reading unit.

According to still another aspect of the invention, the above electronic apparatus further comprises a display unit for displaying data, and a display control unit for displaying on the display unit a function disabling image indicating that a function out of the multiple function is disabled, when the function disabling unit disables the function out of the multiple functions.

According to yet another aspect of the invention, in the above electronic apparatus, the function disabling image displayed on the displaying unit is selected from among plural sorts of images included in the function disabling information read out from the recording medium by the reading unit, and the display control unit displays on the display unit the function disabling image selected from the function disabling information read out by the reading unit, when the function disabling unit disables a function of the multiple functions.

BEST MODE FOR CARRYING OUT THE INVENTION

Now, embodiments of the present invention will be described with reference to the accompanying drawings.

Figures 1, 2, 3:
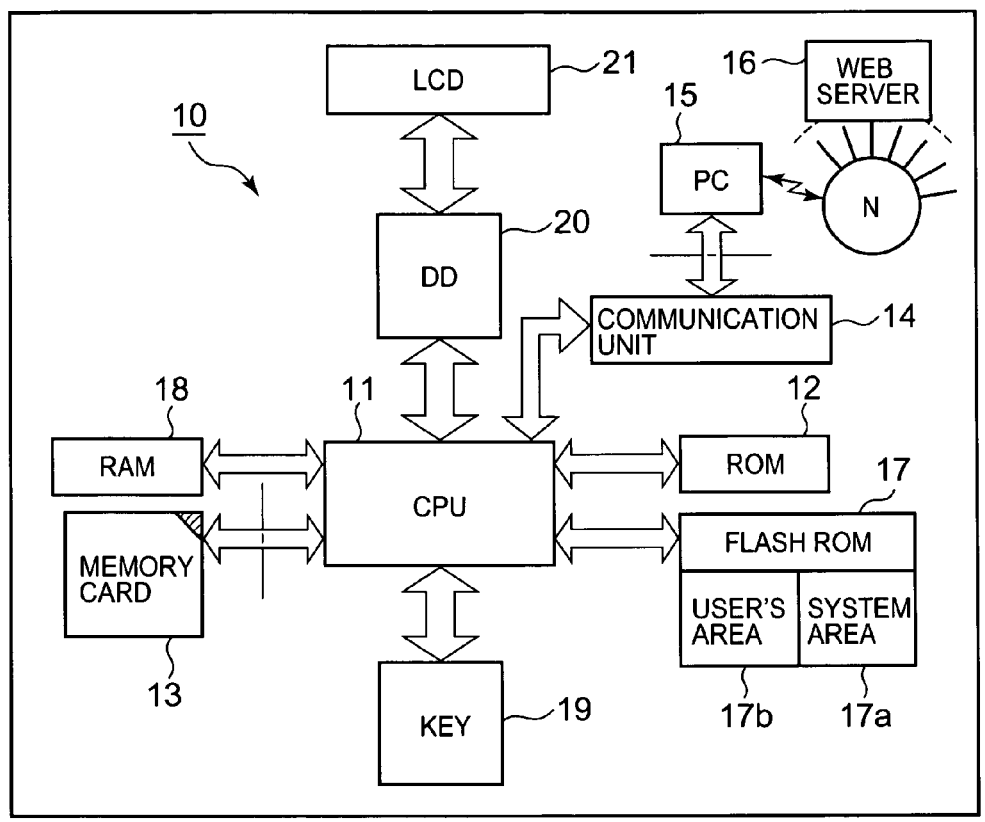
FIG. 1 is a block diagram of a circuit configuration of an electronic calculator (palmtop calculator) according to an embodiment of the present invention.
FIG. 2 is a view showing contents of function disabling information stored on a memory card, which is detachably installed on the electronic calculation for disabling some functions of the electronic calculator.
FIG. 3 is a view showing memory areas for disabling a function, which is prepared in a system area of a flash ROM provided in the electronic calculator.

FIG. 1 is a block diagram of a circuit configuration of an electronic calculator (palmtop calculator) 10 according to an embodiment of the present invention.

FIG. 2 is a view showing contents of function disabling information stored on a memory card 13, which is detachably installed on the electronic calculation for disabling some functions of the electronic calculator 10.

FIG. 3 is a view showing memory areas for disabling a function, which is prepared in a system area 17a of a flash ROM 17 provided in the electronic calculator 10.

Figure 4:
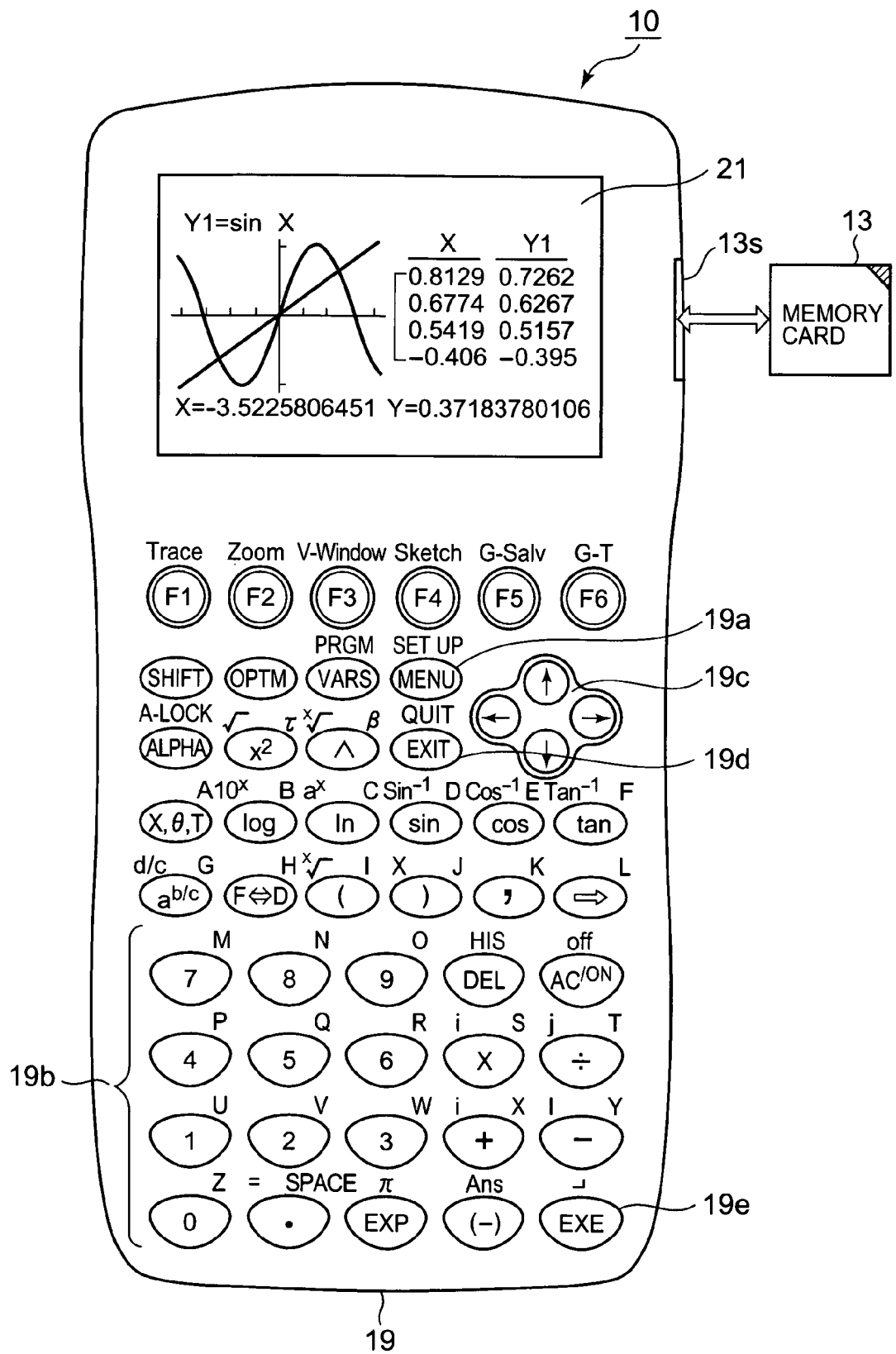
FIG. 4 is a front view illustrating an exterior appearance of the electronic calculator.

FIG. 4 is a front view illustrating an exterior appearance of the electronic calculator 10.

The electronic calculator (palmtop calculator) 10 is provided with a control unit (CPU) 11 serving as a computer. The control unit (CPU) 11 uses RAM 18 as a work memory and executes a system program previously stored on ROM 12, or a calculator control program, which is read out from the memory card 13 and stored on the system area 17a of ROM 17, or a calculation control program, which is down loaded from Web server (program server) 16 connected to a communication network N through a communication unit 14 provided in the electronic calculator 10 and an external personal computer (PC) 15 connected to the communication net work N, and stored on the system area 17a of the flash ROM 17, whereby operation of each unit in the electronic calculator 10 is controlled. The system program previously stored on ROM 12 and the calculation control program read onto the system area 17a of the flash ROM 17 start up in response to a key input signal entered from a key input unit 19.

As shown in FIG. 1, the control unit (CPU) 11 is connected with the ROM 12, memory card 13, communication unit 14, flash ROM 17, RAM 18 and key input unit 19. Further, CPU 11 is connected with a liquid crystal display unit (LCD) 21 through a display driver (DD).

The electronic calculator 10 is provided in its side surface of the body with a card slot 13s for receiving the memory card 13, as shown in FIG. 4. When a memory card on which the function disabling information is recorded is inserted into the card slot 13s of the electronic calculator 10, the function disabling information of the memory card 13 is read out and written onto the system area 17a of the flash ROM 17.

The function disabling information is written onto the memory card 13 according to need in various situations in response to operation of a user on the external computer (PC) 15. As shown in FIG. 2, the function disabling information written on the memory card 13 includes protection-card discriminating data 13p indicating that the memory card 13 has the function disabling information (protection data) written on thereon, start-up disabled application or protected application 13a indicating sorts of functions (application software) to be disabled, protection displaying screen 13b indicating that the calculator is put under a function disabled state, and protection period 13c indicating a period during which the calculator is kept under the function disabled state.

Further, as shown in FIG. 3, in a system area 17a of the flash ROM 17 are prepared memory areas for recording the function disabling information, such as a disabled or protected application memory 17a1, a protection displaying screen memory 17a2, a protection period memory 17a3, a protection flag memory 17a4, a protection timer memory 17a5.

When the memory card 13 with the function disabling information written thereon is installed into the card slot 13s of the electronic calculator 10, the start-up disabled or protected application 13a, protection displaying screen 13b, and protection period 13c are read out from the memory card 13 and transferred respectively onto the memory areas 17a1, 17a2, and 17a3 in the flash ROM 17 of the electronic calculator 10.

On the protection flag memory 17a4 is written a protection flag which indicates that the electronic calculator 10 has been set to the function disabled state in accordance with the start-up disabled or protected application 13a stored on the memory area 17a1. On the protection timer memory 17a5 is stored timer count data which is down counted in accordance with the protection period stored on the memory area 17a3.

It should be noted that access to the system area 17a of the flash ROM 17 by operation of the user is prohibited, and therefore information concerning the function disabling information stored on the memory areas 17a1, 17a2, 17a3, 17a4 and 17a5 cannot be changed or deleted by the user at will.

On a user's memory area 17b in the flash ROM 17 is stored various sorts of data that are input or generated in response to the user's operation while various functions (application software) are running.

As shown in FIG. 4, the electronic calculator 10 is provided with the key input unit 19 on an approximately two third portion of the front surface from the bottom and with the liquid crystal display unit 21 on an approximately one third portion of the front surface from the top.

The key input unit 19 includes a "MENU" key 19a, numeral/operator keys 19b operated for entering numerals and operators, a cursor key 19c operated for moving a cursor to select data on a display screen of the liquid crystal display unit 21, "EXIT" key 19d operated for instructing to return to a process in execution or to get out of the process, and "EXE" key 19e operated for determining selected data and/or for instructing execution of a process. The "MENU" key 19a is operated to display a menu screen G1 for the user to select a function from among various functions (application software) previously installed to the electronic calculator 10.

Now, operation of disabling functions in the electronic calculator 10 having the above configuration will be described.

Figure 5:
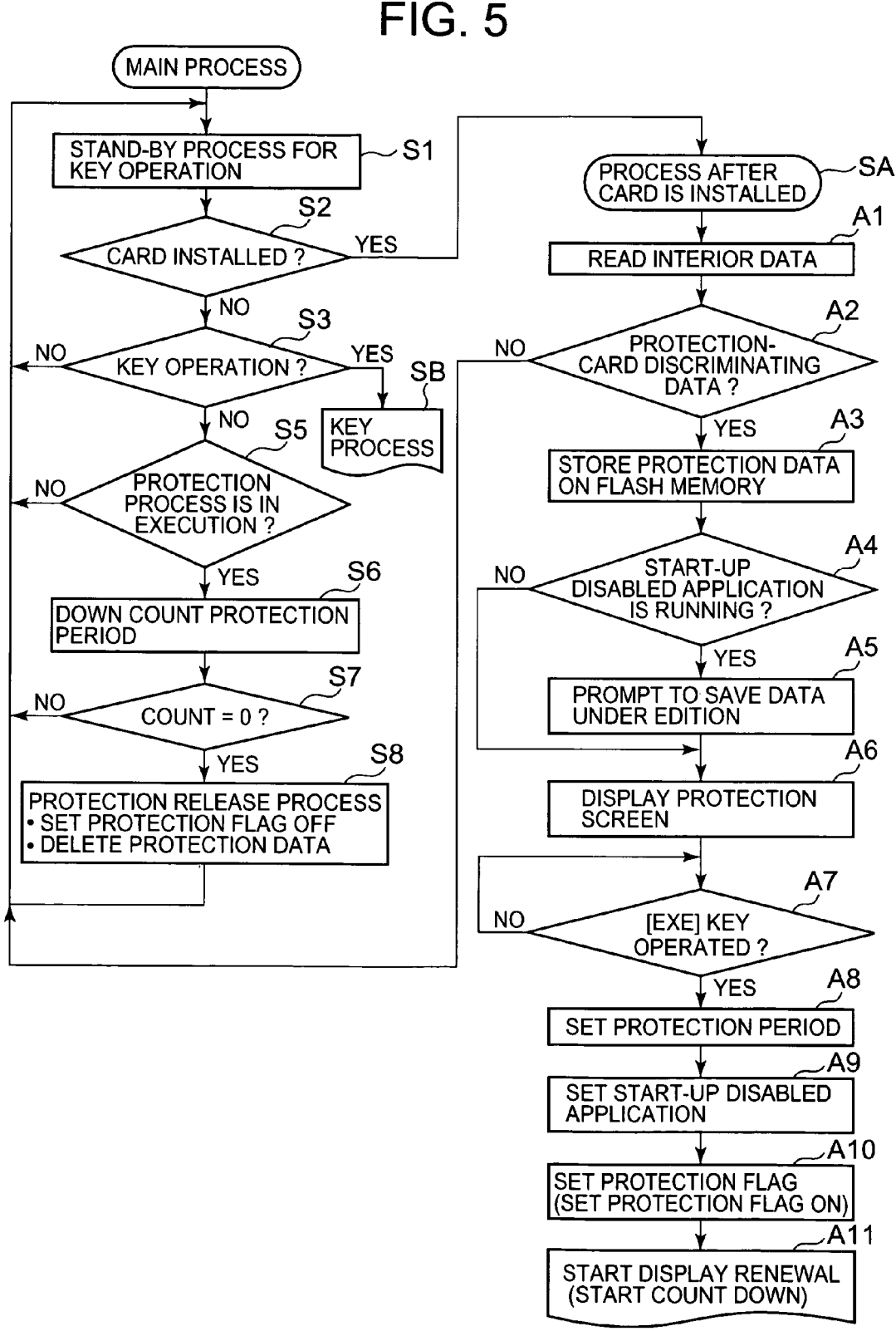
FIG. 5 is a flow chart of a function disabling process in the electronic calculator.

FIG. 5 is a flow chart of a function disabling process in the electronic calculator 10.

Figure 6:
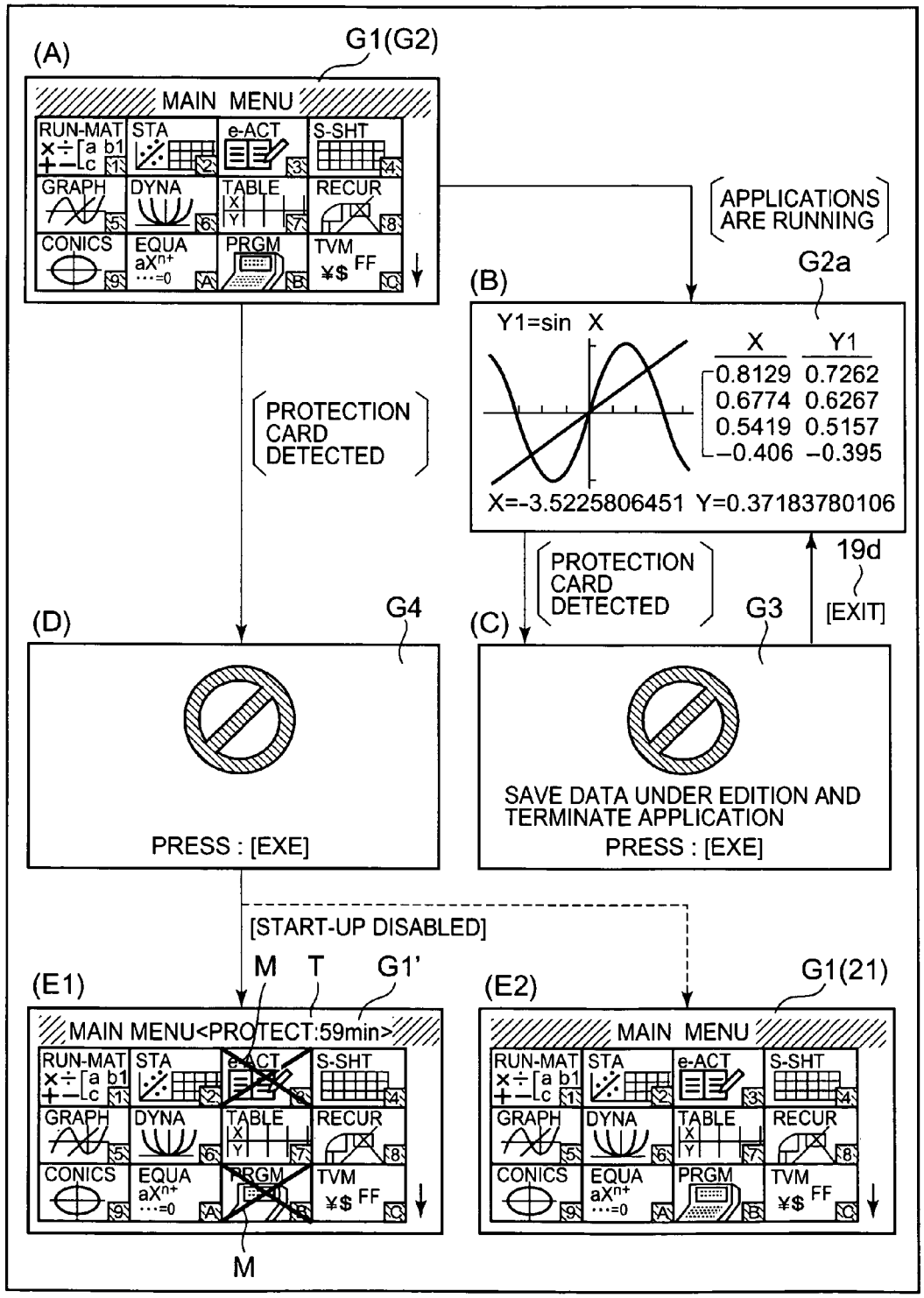
FIG. 6 is a view showing a displaying operation in the function disabling process executed in the electronic calculator.

FIG. 6 is a view showing a displaying operation in the function disabling process executed in the electronic calculator 10.

When the "MENU" key 19a in the key input unit 19 is operated, the menu screen G1 is displayed on the display unit 21 for the user to select his or her desired function (application) as shown at (A) in FIG. 6 and the electronic calculator 10 is brought to a stand-by state for a key input operation at step S1. When the memory card 13 is not detected in the card slot 13s (NO at step S2) and no function has been disabled, in other words, when the electronic calculator 10 is not kept under the function disabled state (NO at step S5), a process corresponding to key input operation in the key input unit 19 is performed (step S3 to SB).

When a "graph•functional calculus" function, "GRAPH (5)" is selected on the function-selecting menu screen G1 and further when the memory card 13 is detected in the card slot 13s at step S2 with a "graph•functional calculus" function displaying screen G2a displayed, as shown at (B) in FIG. 6, the operation advances to a process to be performed after the memory card has been installed (step SA), where interior data of the memory card 13 installed in the card slot 13s is read in at step A1.

Then, it is judged at step A2 whether or not the protection-card discriminating data 13p is included in the interior data of the memory card 13 installed in the card slot 13s to determine if the installed memory card 13 is a start-up protection card or start-up disabling card. For example, when it is determined that the installed memory card 13 is not the start-up protection card but an average data memory card having no protection-card discriminating data 13p, the operation returns to the stand-by state for key input operation in the key input unit 19 (step A2 to S1).

Meanwhile, when it is determined at step A2 that the protection-card discriminating data 13p is recorded on the memory card 13 installed in the card slot 13s and the installed memory card 13 is the start-up protection card, protection data stored on the start-up protection card such as the function disabling information including the protected application 13a, protection display screen 13b and protection period 13c is transferred to and stored on the corresponding memory areas 17a1, 17a2 and 17a3 in the flash ROM 17 at step A3.

When it is determined at step A4 that the protected application 13a stored on the memory area 17a1 of the system area 17a is an application which is now running, that is, that the "graph•functional calculus" function is in execution, a data save message screen G3 is displayed on the display unit 21, prompting the user to save data under edition, as shown at (C) in FIG. 6, at step A5.

When the "EXIT" key 19d is operated with the data save message screen G3 displayed, the "graph•functional calculus" displaying screen G2a is displayed again and data under edition such as graphic data is saved. Then, the protection displaying screen (G4) 13b is read out from the memory area 17a2 in the system area 17a and displayed on the display unit 21 as shown at (D) in FIG. 6, prompting the user to operate an "EXE" key to execute the start-up disabling operation or start-up protection at step A6.

Meanwhile, when it is determined at step A4 that the start-up disabled or protected application 13a stored on the memory area 17a1 in the system are 17a is not running, the protection displaying screen (G4) 13b is read out from the memory area 17a2 in the system area 17a and displayed on the display unit 21 as shown at (D) in FIG. 6, prompting the user to operate the "EXE" key to execute the start-up disabling operation or start-up protection at step A6.

While the protection displaying screen (G4) 13b is displayed on the display unit 21, the protected application 13a cannot be released from the disabled state since only operation of "EXE" key 19e is accepted.

When the "EXE" key 19e in the key input unit 19 is operated in accordance with the indication of the protection displaying screen (G4) 13b at step A7, the protection period 13c (for example, 60 min.) previously transferred and stored on the memory area 17a3 in the system area 17a is set to the timer memory area 17a5 at step A8. Further, in accordance with the protected application 13a transferred and stored on the memory area 17a1 in the system area 17a, the "graph•functional calculus" function is set as the start-up disabled application or start-up protected application at step A9, and a protection flag is set to the memory area 17a4 at step A10.

Then, a function-selecting menu screen G1' is displayed on the display unit 21, in which a start-up disabled mark or start-up protection mark M is added to menu icons which are set as start-up disabled applications or start-up protected applications (in this case, an icon of an "electronic-information utilizing function" e-ACT (3) and an icon of a "program operating function" PRGM (B)) and a protection remaining time T is added too, as shown at (E1) in FIG. 6. At the following step A11, a count down process of the protection period 13c previously set to the protection timer memory 17a5 starts and also a display screen renewing process starts.

Since the user have learned from the indication of the protection displaying screen G4 (FIG. 6, (D)) displayed at step A6 that the electronic calculation 10 is kept in the function disabled state, an arrangement may be made to the process at step A11, such that the normal function-selecting menu screen G1 is displayed again with no start-up protection mark M and protection remaining time T displayed as shown at (E2) in FIG. 6, and the count down process of the protection period 13c previously set to the protection timer memory 17a5 starts.

Figure 7:
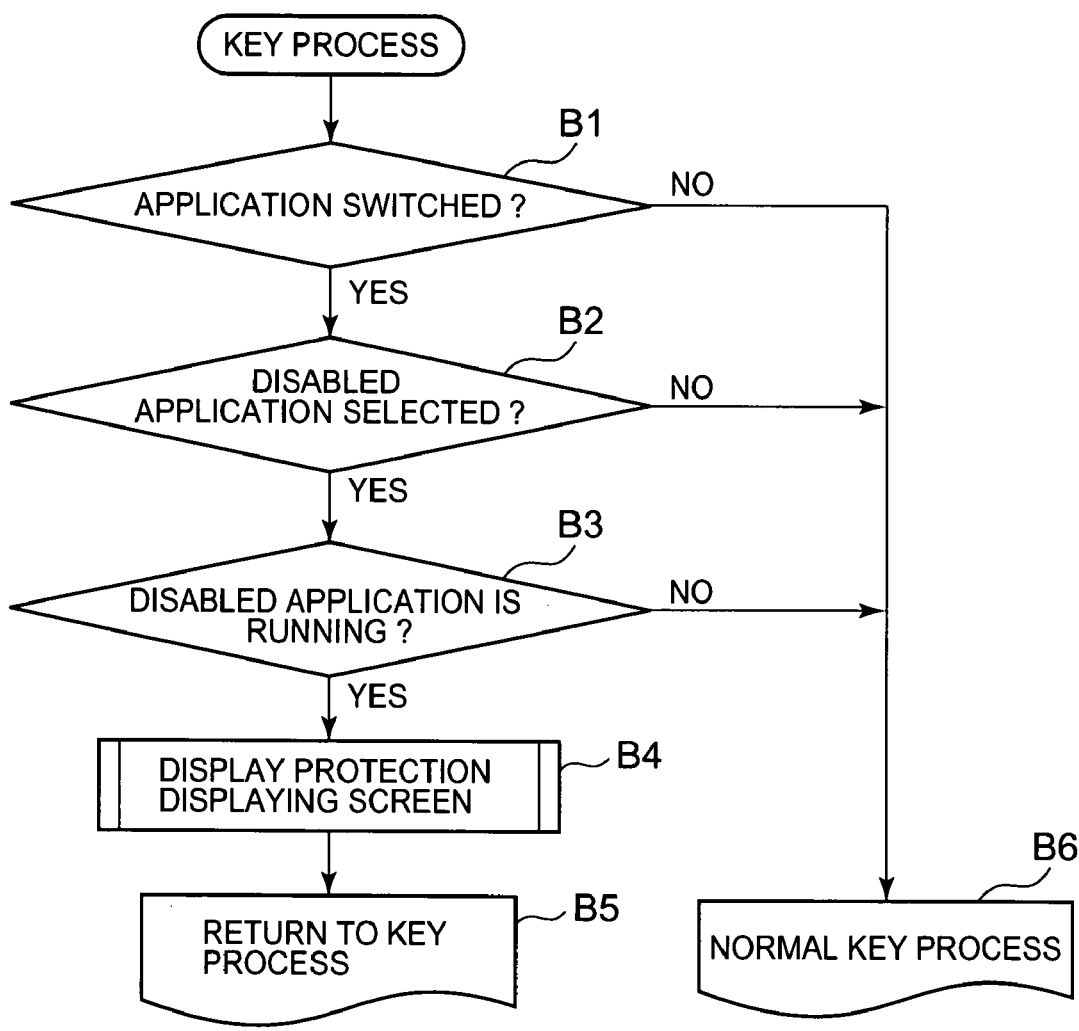
FIG. 7 is a flow chart of a key process (SB) in the function disabling process executed in the electronic calculator.

In the arrangement, every time when the menu icon of a start-up disabled function is selected, the protection displaying screen G4 (Refer to FIG. 6, (D)) is displayed, advising the user of the selected function being disabled (Refer to FIG. 7, steps B1 to B5).

Thereafter, while the start-up protection process is in execution in accordance with the function disabled information (protection data) 13a, 13b and 13c read out from the memory card (start-up protection card) 13, the count down process of counting the protection period 13c set to the protection timer memory 17a5 is performed continuously and the start-up disabled state (function disabled state) is kept, even after the memory card 13 is removed from the card slot 13s (step S5 to steps S6 and S7).

When the count of the protection period 13c set to the protection timer memory 17a5 has reached an amount of "0" and the count down process terminates, the protection flag set to the memory area 17a4 in the system area 17a is reset and all the function disabled information (protect data) stored respectively on the memory areas 17a1, 17a2 and 17a3 in the system area 17a is deleted, and then the start-up disabling operation terminates, that is, the start-up protection is released (steps S7 to S8).

FIG. 7 is a flow chart of a key process (SB) in the function disabling process executed in the electronic calculator 10.

Figure 8:
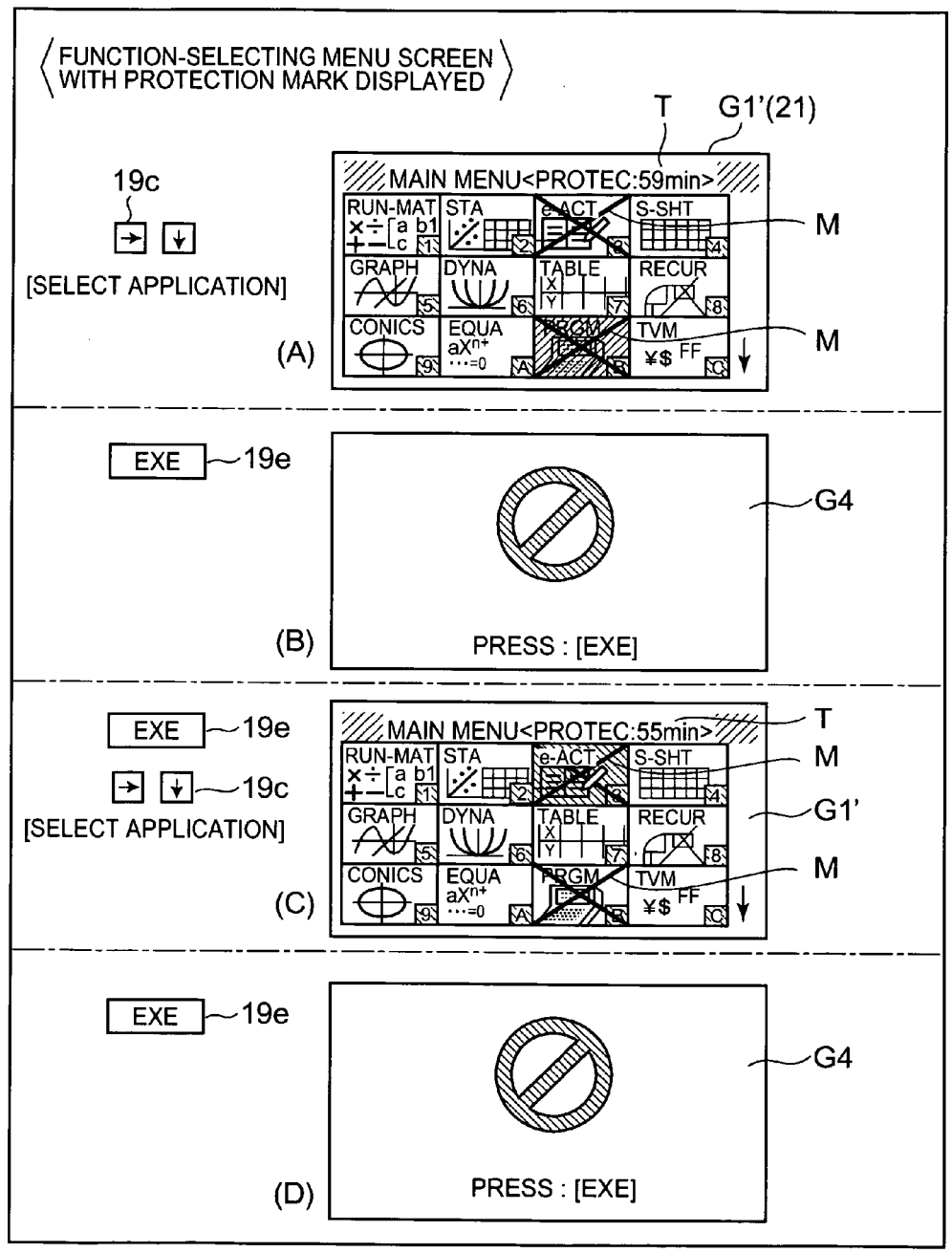
FIG. 8 is a view of a displaying operation during the key process (SB) executed in a start-up disabling operation or start-up protection performed in the course of the function disabling process in the electronic calculator.

FIG. 8 is a view of a displaying operation during the key process (SB) executed in a start-up disabling operation or start-up protection performed in the course of the function disabling process in the electronic calculator 10.

While the function-selecting menu screen G1' is displayed on the display unit 21 as shown at (A) in FIG. 8, in which the start-up disabled marks M are added to the menu icons which are set as start-up disabled applications (in this case, an icon of an "electronic information utilizing function" e-ACT (3) and an icon of a "program operating function" PRGM (B)) and the protection remaining time T is added too, as shown at (A) in FIG. 8, the cursor key 19c is operated to switch an application (start-up enabled function) at step B1 in FIG. 7. When the icon of the icon of the "program operating function" PRGM (B)), which is disabled from starting up, is selected by operation of the cursor key 19c (YES at B2), it is determined at step B3 that the start-up disabled function has been selected or instructed to start up, and the protection displaying screen (G4) 13b is read out from the memory area 17a2 of the system area 17a and displayed on the display unit 21 as shown at (B) in FIG. 8, indicating at step B4 that the selected "program operating function" PRGM (B) is now disabled from starting up.

The operation returns to the key process again at step B5. When the "EXE" key 19e is operated in accordance with the indication of the protection displaying screen G4, the operation advances to the normal key process at step B6, where the function-selecting menu screen G1 including the icons which are disabled from starting-up is displayed on the display unit 21 as shown at (C) in FIG. 8.

On the function-selecting menu screen G1' displayed on the display unit, which screen includes the icons disabled from starting-up (steps B1 to B2), when the cursor key 19c is operated to switch a start-up enabled function (application) to the icon of the "electronic-information utilizing function" e-ACT (3), which is disabled from starting up, it is determined at step B3 that the start-up disabled function (application) has been instructed to start up, and the protection displaying screen (G4) 13b is displayed on the display unit 21 as shown at (D) in FIG. 8, indicating at step B4 that the "electronic-information utilizing function" e-ACT (3) selected and instructed to start up is now disabled from starting up.

Then, the operation returns to the key process again at step B5, where the calculator is brought to the stand-by state for a key input operation of the "EXE" key 19e in accordance with the indication of the protection displaying screen G4.

More specifically, while the start-up disabled application or protected application 13a is kept in the function disabled state in accordance with the function disabling information (protection data) 13a, 13b and 13c which are read out from the memory card (start-up protection card) 13 and stored on the memory areas 17a1, 17a2 and 17a3 in the system area 17a, even if the user selects a menu icon of the start-up disabled function to start up the same, the protection displaying screen G4 is displayed, indicating that the selected function is now disabled from starting up, every selection of the start-up disabled function, and the electronic calculator 10 is brought to the stand-by state in which only operation of the "EXE" key 19e is accepted, whereby the start-up disabled state cannot be released by the user.

When the count of the protection period 13c set to the protection timer memory 17a5 in the system area 17a has reached an amount of "0", terminating the count down process, the protection flag set to the memory area 17a4 in the system area 17a is reset and all the function disabled information (protection data) stored respectively on the memory areas 17a1, 17a2 and 17a3 in the system area 17a is deleted, and then the start-up protection is released (steps S5 to S8).

Figure 9:
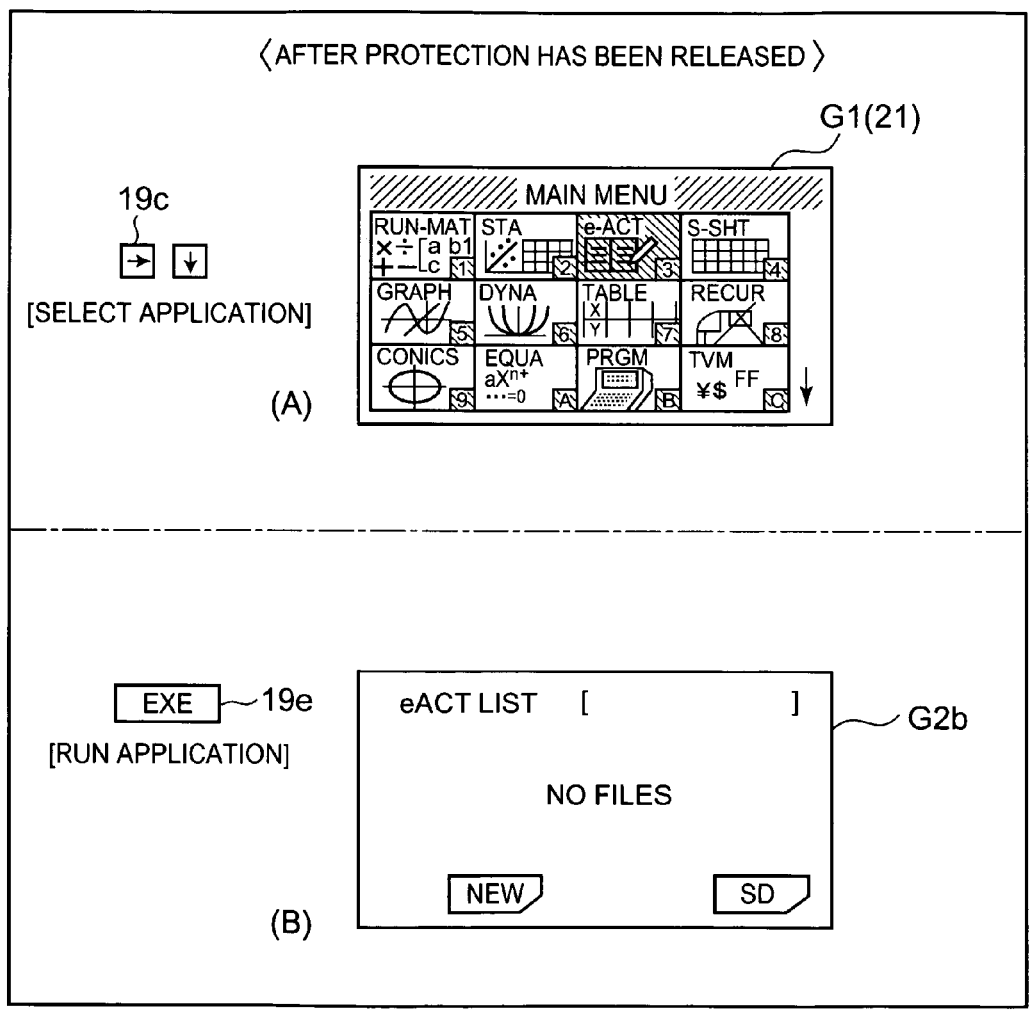
FIG. 9 is a view of a displaying operation during the key process (SB) executed after the start-up protection is released in the course of the function disabling process in the electronic calculator.

FIG. 9 is a view of a displaying operation during the key process (SB) executed after the start-up protection is released in the course of the function disabling process in the electronic calculator 10.

When the cursor key 19c is operated to switch the start-up enabled function (application) to the icon of the "electronic information utilizing function" e-ACT (3) on the function-selecting menu screen G1 displayed on the display unit 21 as shown at (A) in FIG. 9 (steps B1 to B2 (NO)) after the start-up protection has been released, the operation returns to the normal key process at step B6, where the "electronic-information utilizing function" e-ACT (3), the icon of which has been selected, starts up in response to the operation of the "EXE" key 19e in the key input unit 19, and a list displaying screen G2b for displaying a list of electronic-information files is displayed as shown at (B) in FIG. 9.

When the protection period 13c set to the protection timer memory 17a5 reaches the amount of "0", the function (application) is released from the start-up disabled state, which function (application) is disabled from starting up in accordance with the function disabling information (protection data) 13a, 13b and 13c which are read out from the memory card (start-up protection card) 13 and stored on the memory areas 17a1, 17a2 and 17a3 of the system area 17 in the flash ROM 17.

In the function disabling process of the electronic calculator 10 having the above configuration, when the memory card (start-up protection card) 13 having the function disabling information (protection data) (start-up disabled application or protected application 13a, protection displaying screen 13b and protection period 13c) is detected in the card slot 13s, the function disabling information (protection data) 13a, 13b and 13c which is read out from the memory card (start-up protection card) 13 and stored on the memory areas 17a1, 17a2 and 17a3 of the system area 17 in the flash ROM 17, and the protection displaying screen G4 is displayed on the display unit 21, informing that an application start-up disabling process has started. In the application start-up disabling process, only the key input operation of "EXE" key 19e is accepted, and the functions corresponding to the start-up disabled or protected application 13a are brought in the disabled state, and then the function selecting menu screen G1' is displayed on the display unit 21, in which the start-up disabled marks M are added onto the start-up disabled functions and the protection remaining time T is included.

For example, in case that students are allowed to use an electronic calculator, but some functions such as the "electronic information utilization function" e-ACT (3) and "program operating function" PRGM (B) are not allowed to use in a class room, the protection displaying screen G4 and the function-selecting menu screen G1' with the start-up disabled marks M added are displayed on the display unit 21 in response to installation of the memory card (start-up protection card) 13, whereby an examiner is informed clearly that these functions has been disabled from starting-up and protected. Further, when function disabling information (protection data) 13a, 13b and 13c for disabling functions that the examiner designates is recorded on a memory card, and the memory card is installed in rotation to all the electronic calculators of the students one by one, then all the electronic calculators are set to the same function disabled state without failure, since the function disabled state cannot be released until the count of the protection remaining period T reaches the amount of "0".

The electronic calculator according to the embodiment of the invention is arranged to be released from the function disabled state, only when the counting operation of the protection period 13c read out from the memory card (start-up protection card) 13 and stored on the flash ROM 17 terminates. But as will be described with reference to a flow chart shown in FIG. 10, a modification may be made to the above mentioned embodiment, such that, even if a function is set to the start-up disabled state, the function can be released from the start-up disabled state, only when all the information recorded on the flash ROM 17 is initialized to be reset while other functions which are not disabled from starting up are running.

Figure 10:
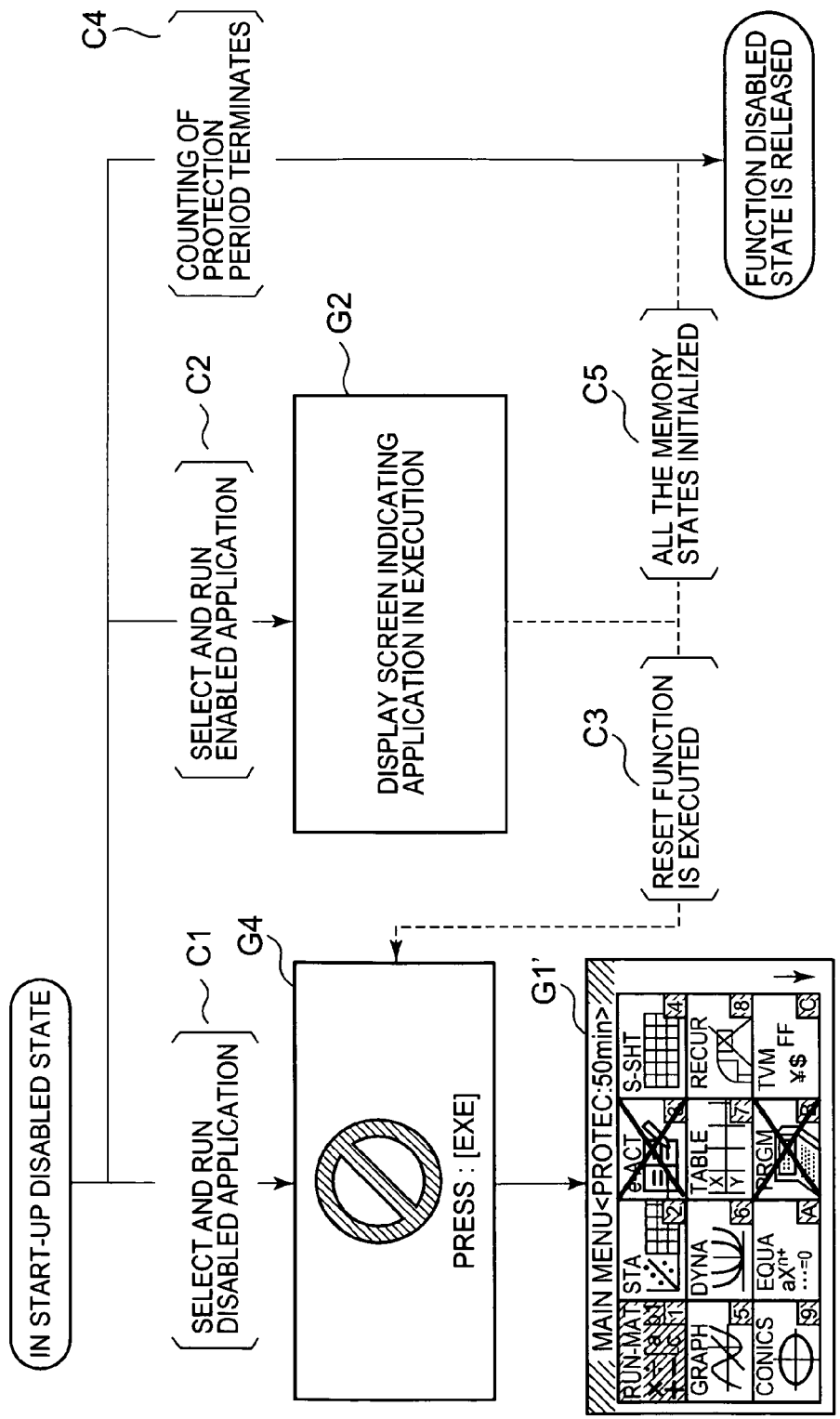
FIG. 10 is a flow chart of a start-up disabled function releasing process performed in the start-up disabled state or in the start-up protection in the electronic calculator.

FIG. 10 is a flow chart of a start-up disabled function releasing process performed in the start-up disabled state or in the start-up protection in the electronic calculator 10.

When an application 13a is selected to run in the function disabled state set in accordance with the function disabling information (protection data) 13a, 13b and 13c read out from the memory card (start-up protection card) 13 (step C1), the protection displaying screen G4 is displayed, indicating that the selected application is in the start-up disabled state, as described above, and the function-selecting menu screen G1' with the start-up disabled marks M and protection remaining time T added is displayed in response only to the input operation of the "EXE" key 19e.

Even if a reset function is executed by the user at step C3, for example, to reset only RAM 18, only the flash ROM 17, or only an external memory (memory card 13) while an enabled function (enabled application) is running in the function disabled state at step C2 and a display screen G2 is displayed, indicating that the corresponding function is running, the protection displaying screen G4 is displayed, indicating that the application is kept in the start-up disabled state, and the function-selecting menu screen G1' with the start-up disabled mark M and protection remaining time T added is displayed in response only to the input operation of the "EXE" key 19e.

In other words, even though a part of contents on the memory is initialized to execute the reset function, the function disabled state is not released, since there is a possibility that the information which is not allowed to use in the class room can be obtained by using the function which has been released from starting-up based on the data which has not been reset and still stored on the memory.

Meanwhile, when all the memory states are initialized to be reset at step C5 while the enabled function (enabled application) is running in the function disabled state at step C2 and the display screen G2 is displayed, indicating that the corresponding function is running, the function disabled state is released even while the protection period 13c is being down counted.

In other words, the function disabled state is released, since there is little possibility of the prohibited information being used in the class room when all the contents on the memory are initialized to be reset.

Further, when the down counting operation of the protection period 13c terminates during the function disabled state at step C4, the function disabled state is released in the same manner as described above.

The electronic calculation is so arranged that all the memory states is initialized to be reset by user's operation such as selecting a reset menu, operating plural predetermined keys simultaneously, and/or pressing a particular reset button.

Now, a process will be described, of writing desired function disabling information (protection data) 13a, 13b and 13c onto the memory card 13 to produce a start-up disabling card (start-up protection card).

Figure 11:
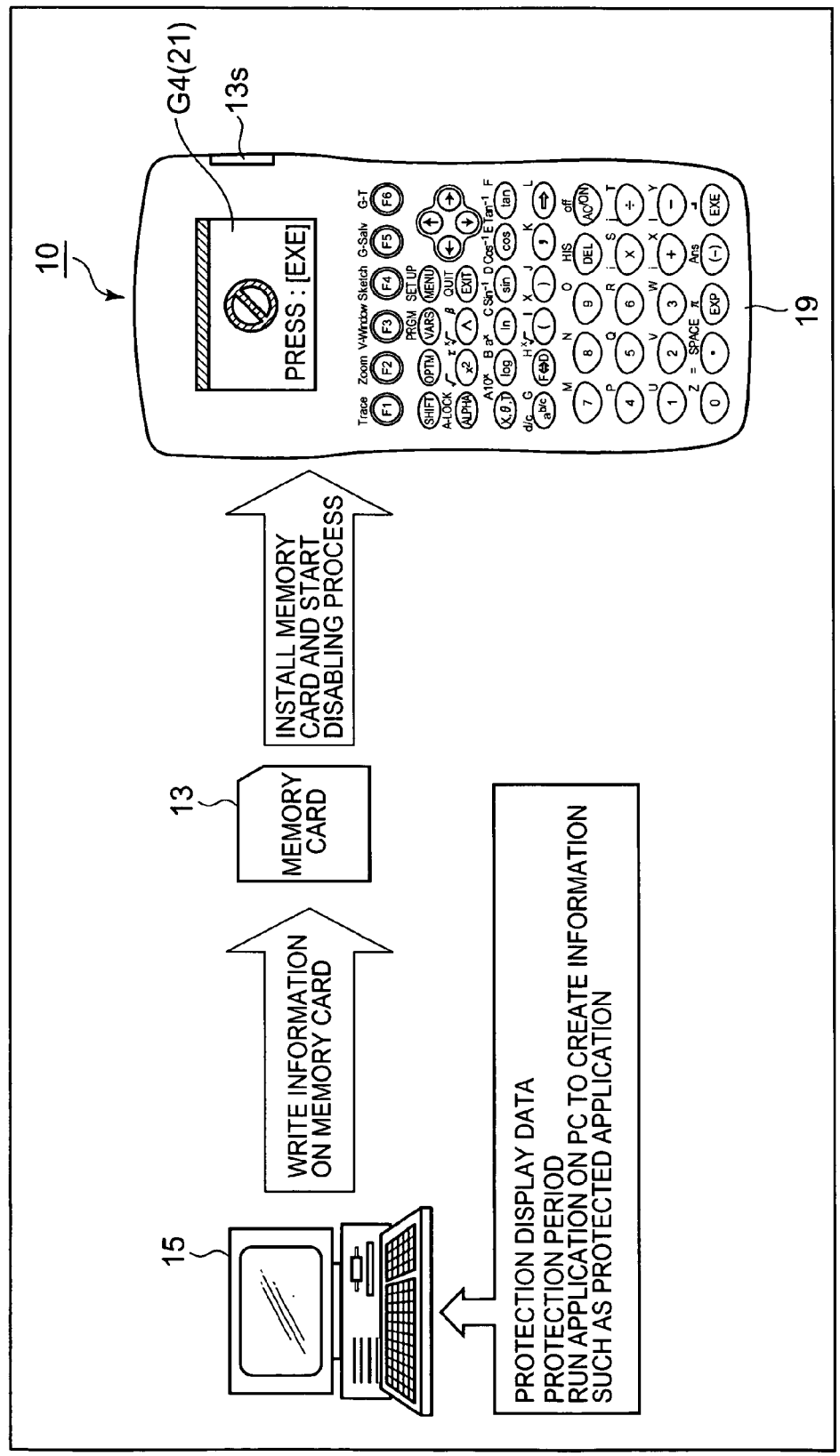
FIG. 11 is a view illustrating a schematic procedure for producing a memory card (function disabling memory card or start-up protection card) used to disable some functions of the electronic calculator.

FIG. 11 is a view illustrating a schematic procedure for producing a memory card (function disabling memory card or start-up protection card) 13 used to disable some functions out of the multiple functions of the electronic calculator 10.

The function disabling information (protection data) including a start-up disabled or protected application 13a, a protection displaying screen 13b and a protection period 13c is created and entered in accordance with a special application running on the external personal computer (PC) 15. Then, the function disabling information is written on the memory card 13 inserted directly into a card slot of PC or installed into the card slot via a card writer.

When the function disabling memory card (start-up disabling card) 13 is temporarily installed into the card slot 13s of the electronic calculator as described above, the function disabling information (protection data) 13a, 13b and 13c on the memory card (start-up disabling card) is read out and stored on the system area 17a of the flash ROM 17 of the electronic calculator. The protection data on the system area 17a is protected from being removed by user's access, and the protection displaying screen G4 is displayed on the display unit 21, whereby the predetermined functions are disabled from starting-up and cannot be used.

Figure 12:
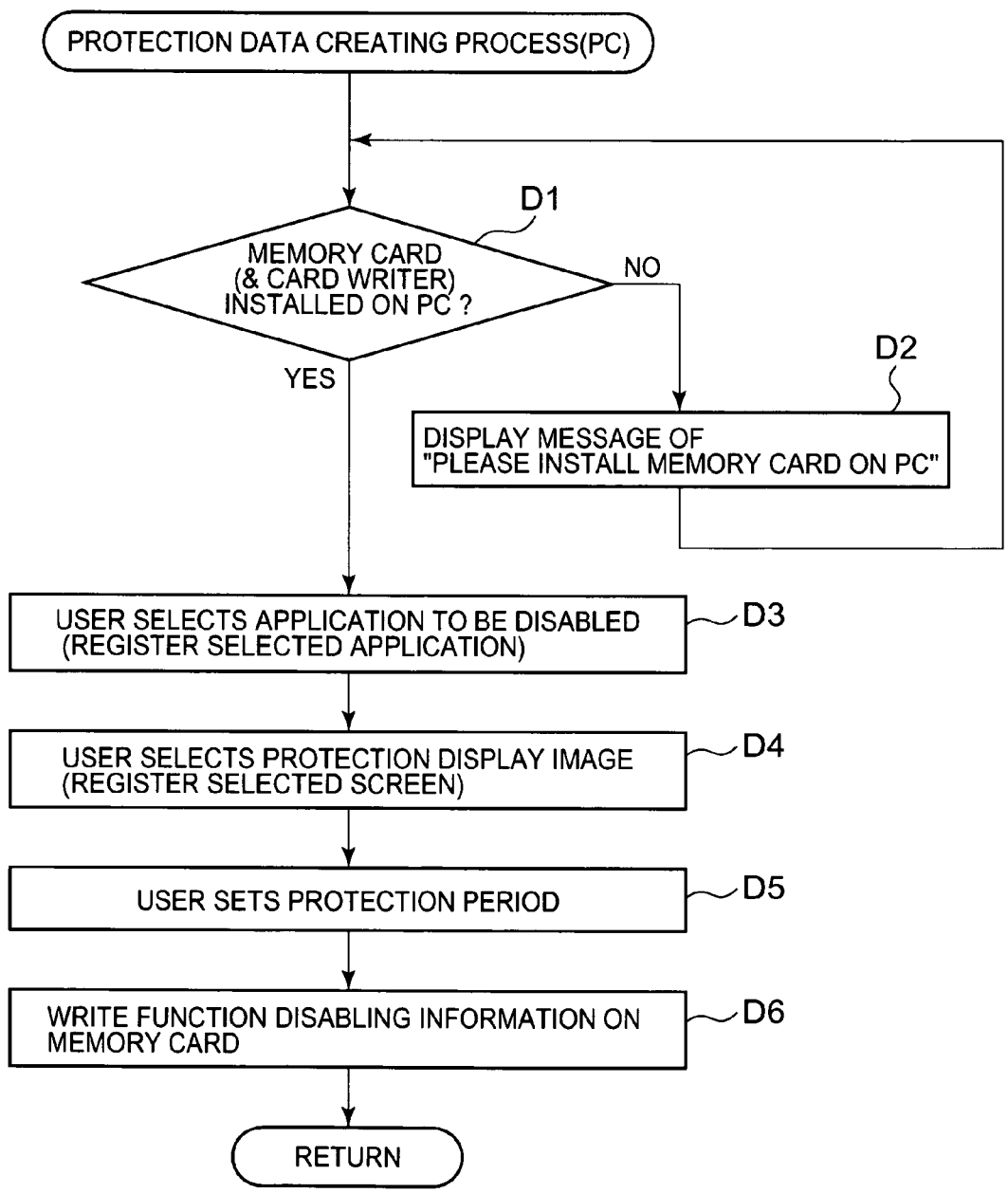
FIG. 12 is a flow chart of a disabling data creating process for producing the function disabling memory card (start-up protection card), which runs as a special application on an external personal computer.

FIG. 12 is a flow chart of a disabling data creating process for producing the function disabling memory card (start-up protection card) 13, which runs as a special application on an external personal computer 15.

Figure 13:
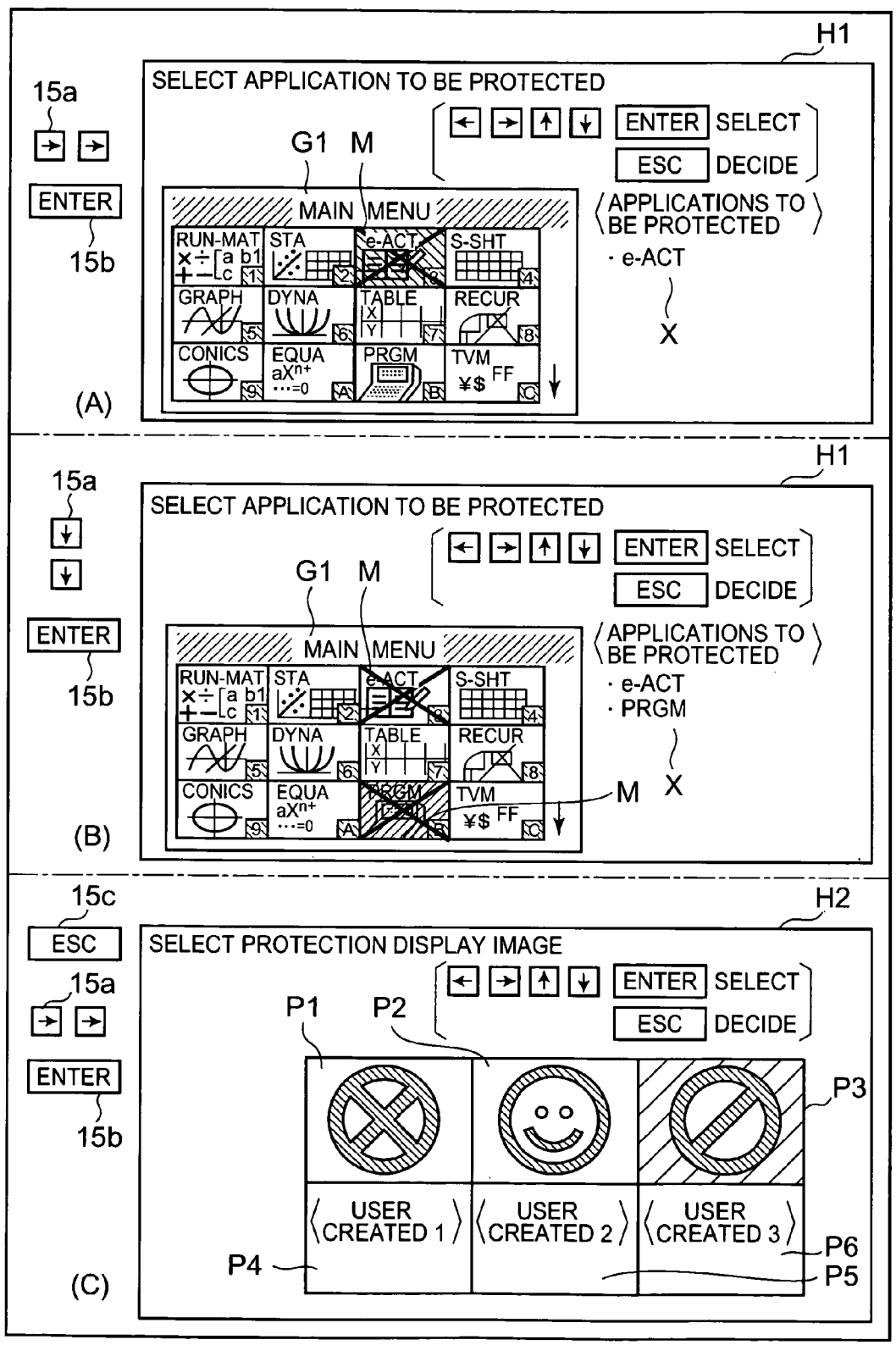
FIG. 13 is a view showing a displaying operation (#1) executed in response to a key operation performed during the disabling data creating process or protection data creating process in the external personal computer.

FIG. 13 is a view showing a displaying operation (#1) executed in response to a key operation performed during the disabling data creating process or protection data creating process in the external personal computer 15.

Figure 14:
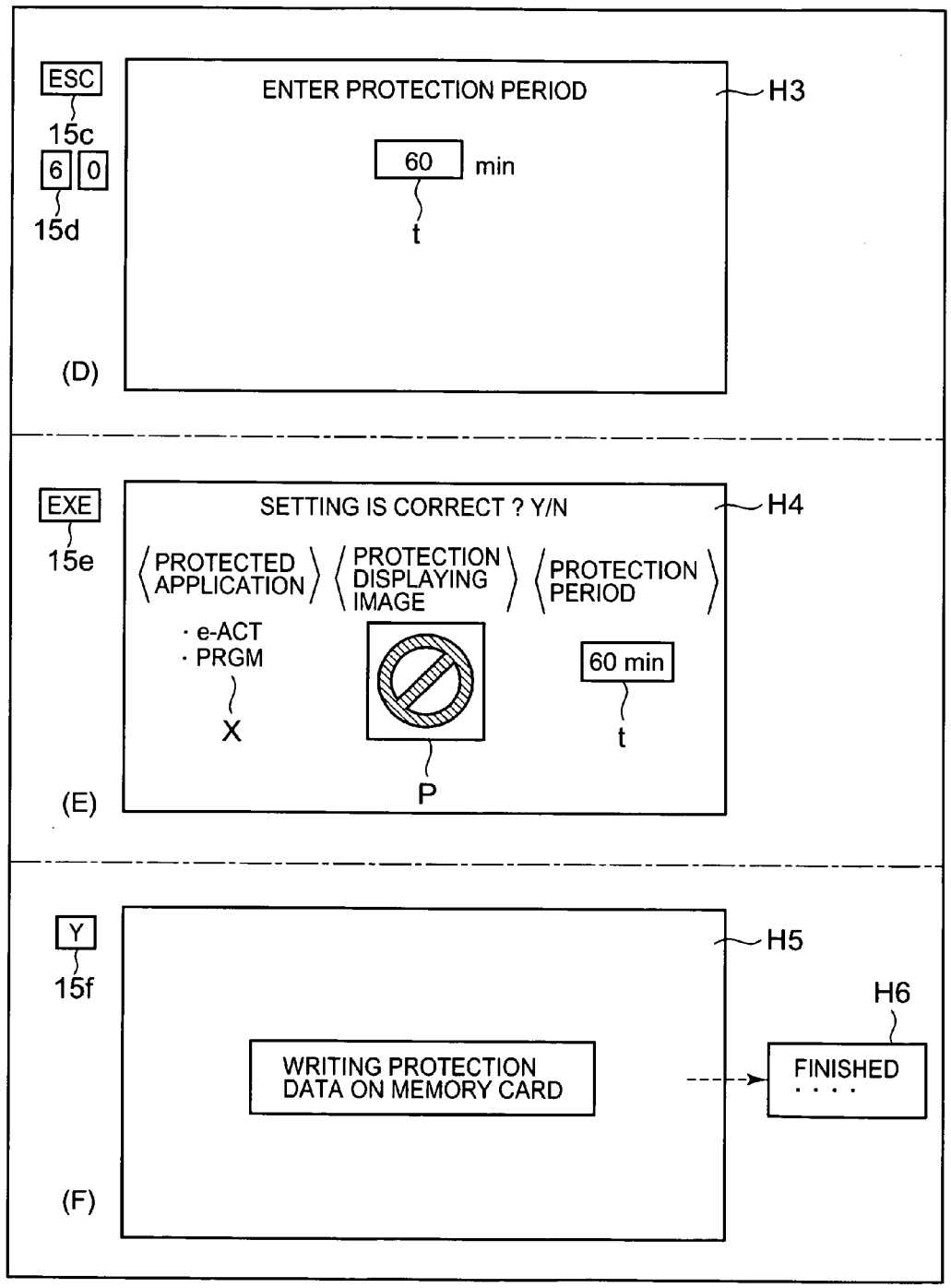
FIG. 14 is a view showing a displaying operation (#2) executed in response to a key operation performed during the disabling data creating process or protection data creating process in the external personal computer.

FIG. 14 is a view showing a displaying operation (#2) executed in response to a key operation performed during the disabling data creating process or protection data creating process in the external personal computer 15.

When the disabling data creating process starts on the external PC 15, it is judged at step D1 whether or not the memory card 13 has been installed directly into the card slot 13s of the PC 15 or connected to PC 15 via the card writer.

When it is determined that the memory card 13 is not connected to or installed on PC 15, a message screen (not shown) is displayed on PC 15, prompting to install the memory card 13 on PC 15 at step D2.

Meanwhile, when it is determined that the memory card 13 has been connected to or installed on PC 15, an disabled application selecting screen H1 is displayed for selecting an application to be disabled or protected (hereafter, disabled application, or protected application) as shown at (A) in FIG. 13, prompting the user to select a disabled application (function) on the function-selecting menu screen G1 available on the electronic calculator 10 at step D3.

As shown at (A) and (B) in FIG. 13, when the user selects his or her desired applications (functions) successively on the disabled application selecting screen H1 by operating cursors 15a and "ENTER" key 15b on the function-selecting menu screen G1, and the application selected by the user is a disabled application (protected application), for example, such as the "electronic-information utilizing function" e-ACT (3) and the "program operating function" PRGM (B), the start-up disabled mark M is added and displayed onto the icon of the selected disabled application, and a symbol of the selected disabled application is arranged and displayed in a disabled application area X every time when a disabled application is selected.

Then, the titles of the disabled applications such as "electronic-information utilizing function" e-ACT (3) and "program operating function" PRGM (B) are registered in a built-in memory of the PC at step D3.

When the disabled applications 13a are registered, and "ESC" key 15c is operated, a protection display selecting screen H2 is displayed as shown at (C) in FIG. 13 at step D4, prompting the user to select on the protection displaying screen G4 (13b) display images from among previously prepared protection display candidate images P1, P2, P3 and original protection display candidate images P4, P5, P6, which are arbitrarily created by the user.

The original protection display candidate images P4, P5, P6 are created by disposing dot points according to the user's desire.

When the cursors 15a and "ENTER" key 15b are operated to select and determine one display candidate image, for example, the display candidate image P3 among the display candidate images P1, P2, P3 and original candidate images P4, P5, P6 included in the protection display selecting screen H2, the protection displaying screen G4 (13b) based on the selected display candidate image P3 is registered on the built-in memory of PC at step D4.

When the start-up disabled application 13a and the protection displaying image G4 (13b) have been selected and registered in the manner mentioned above and the "ESC" key 15c is operated, a protection period setting screen H3 is displayed as shown at (D) in FIG. 4 at step D5, prompting the user to enter and set in a period setting area "t" a protection period 13c for the start-up disabled application 13a.

When a desired protection period 13c, for example, "60 min." for the disabled application 13a is entered and set to the period setting area "t" in the protection period setting screen H3 by operating a numeral key 15d, and is determined by operating the "EXE" key 13e, a function disabling information confirming screen H4 is displayed, wherein the disabled applications, such as "e-ACT" and "PRGM", registered in the disabled application selecting screen H1 are displayed at the disabled application area (protected application area) X, and the protection displaying image G4 (13b) based on the display candidate image P3 registered in the protection display selecting screen H2 is displayed in an image display area P, and the protection period 13c ("60 min.") is displayed in the period setting area "t", prompting the user's confirming operation.

The contents of the function disabling information (protection data) including the start-up disabled applications 13a, "e-ACT", and "PRGM", the protection displaying screen 13b, "P3", and the protection period 13c, "60 min.", which are arbitrarily set by the user on the function disabling information confirming screen H4, is confirmed by the user to be correct and when "Y" key 15f is operated by the user, a message screen H5, indicating that data is being written onto the card, is displayed and the function disabling information (protection data) 13a, 13b, 13c registered on the memory of PC is written onto the memory card 13 received in PC 15 at step D6.

When all the function disabling information (protection data) 13a, 13b, 13c registered on the built-in memory of PC has been written onto the memory card 13 at step D6, a message H6, indicating that the data writing operation has finished, is displayed at step D6, informing that a function-disabling memory card (start-up disabling card) 13 for the electronic calculator has been produced.

Therefore, using the protection data generating function for producing the function-disabling memory card (start-up disabling card) 13 on the external PC, various sorts of function disabling information (protection data) such as the start-up disabled or protected application 13a, protection display screen 13b and protection period 13c can be set arbitrarily and separately by selecting-operation of the user. When some functions out of the multiple functions of the electronic calculators 10 of the students, who are taking an examination, are protected or disabled only during the examination, the functions to be disabled can be selected and set depending on the contents of such examination, and further the protection period can be set may depending on an examination time.

The protection displaying image G4 (13b) is used by the examiner to confirm whether each electronic calculator is kept in the function disabling state (start-up protection). The contents of the protection displaying image G4 (13b) can be set not only by selecting from the previously prepared display candidate images P1, P2, P3 but also by selecting from the user prepared original candidate images P4, P5, P6, and therefore, the contents of the protection displaying image G4 (13b) can be changed and set every time when an examination is given. Even if a student keeps the protection displaying image G4 prepared for the examination he or she took previously, and shows to the examiner as if his or her electronic calculator has been set in the correct function disabled state (start-up protection), the examiner can find and prevent such a fraud of the student by comparing the contents of the protection displaying screen G4 (13b) of the student with the those of the protection displaying image G4 (13b) written on the memory card 13 produced on the external PC.

As described in the above embodiment of the invention, the processes performed on the electronic calculator 10 and on the external computer (PC) 15 include those processes such as the function disabling process for the electronic calculator (palmtop calculator) 10 shown by the flow chart of FIG. 5, the key process (SB) performed in the function disabling process for the electronic calculator (palmtop calculator) 10 shown by the flow chart of FIG. 7, the releasing process for releasing the function disabled state for the electronic calculator (palmtop calculator) 10 shown by the flow chart of FIG. 10, and the protection data generating process for producing a function disabling card (start-up disabling card) on the external PC shown by the flow chart of FIG. 12. These processes may be written as a computer program to be executed by a computer. Further the computer program may be recorded on an external storing medium, including a memory card 13 (such as ROM card, RAM card and the like), a magnetic disk (such as a floppy disk, hard disk, and the like), an optical memory disk (such as CD-ROM, DVD and the like), and a semi-conductor memory, and the like, and the computer program recorded on the storing medium may be distributed conveniently. An electronic apparatus, such as a computer terminal and PC (15), provided with various sorts of functions such as a graph•functional calculus function, is capable of reading the computer program from the external storing medium onto the flash ROM 17 and/or onto the built-in memory, and is controlled in accordance with the computer program stored therein to realize the function disabling function, releasing function for releasing the function disabling function, and the function for generating the function disabling information in the external PC, whereby the above mentioned processes are performed by the electronic apparatus in a similar manner.

Program data for realizing the above processes may be converted into program codes and transferred through a communication network (Internet) N. The electronic apparatus with multiple functions receives the program data through a computer terminal (program server) connected to the communication network (Internet) N and executes the function disabling function, releasing function for releasing the function disabling function, and realizes the function for generating the function disabling information in place of the external PC.

The scope of the present invention is not limited to the above embodiments, and may be modified or changed in various ways as far as the modifications or changes do not apart from the spirit of the invention. The above embodiments include the present inventions in various stages, and the plural elements disclosed therein may appropriately be combined to derive the invention. For example, even if some elements may be eliminated from the configuration having all the elements disclosed in the embodiments, or additional elements may be combined, inventions may be derived from the configuration with some elements removed or the combination including such additional elements, when the problems solved by the present invention may be solved and the effects obtained by the present invention may be obtained.

What is claimed is:

1. A scientific electronic calculating apparatus comprising:
a display unit;
a menu screen display control unit for controlling the display unit to display a function-selecting menu screen for selecting a function to be executed from among a plurality of calculating functions executable by the scientific electronic calculating apparatus;
a recording medium receiving unit for receiving a recording medium;
a reading unit for reading out (i) function disabling information for disabling at least one of the plurality of calculating functions and (ii) a function-disabled image, from the recording medium received in the recording medium receiving unit;
a function disabling unit for disabling at least one function of the plurality of calculating functions based on the function disabling information read out by the reading unit;
a function-disabled image display control unit for controlling the display unit to display the function-disabled image read out by the reading unit, when a function is disabled by the function disabling unit; and
a start-up disabled mark display control unit for controlling the display unit to display, on the function-selecting menu screen, a mark indicating the at least one function disabled by the function displaying unit as a disabled function among the plurality of calculating functions, after the function-disabled image display control unit controls the display unit to display the function-disabled image.

2. The scientific electronic calculating apparatus according to claim 1, wherein the reading unit reads out function disabling time information that defines a time period during which the at least one function is to be disabled, from the recording medium received in the recording medium receiving unit; and
wherein the function disabling unit disables the at least one function for the time period defined by the function disabling time information.

3. The scientific electronic calculating apparatus according to claim 2, further comprising:
a time counting unit for counting a time remaining during which the at least one function is to be kept disabled by the function disabling unit, based on the function disabling time information; and a time display control unit for controlling the display unit to display the time counted by the time counting unit.

4. The scientific electronic calculating apparatus according to claim 1, wherein the reading unit reads out a plurality of function-disabled images from the recording medium; and
wherein the function-disabled image display control unit controls the display unit to display a preselected one of the plurality of function-disabled images, when at least one function is disabled by the function disabling unit.

5. The scientific electronic calculating apparatus according to claim 1, further comprising:
a protected information storing area configured such that data on the information storing area cannot be erased by a user of the scientific electronic calculating apparatus; and
a record control unit for storing the function disabling information and the function-disabled image read out by the reading unit in the protected information storing area;
wherein the function disabling unit disables the at least one function based on the information stored in the protected information storing area.

6. The scientific electronic calculating apparatus according to claim 1, wherein the recording medium is a memory card; and
wherein the scientific electronic calculating apparatus further comprises:
a recording medium detecting unit for detecting the memory card received by the recording medium receiving unit;
wherein the reading unit reads out the function disabling information and the function-disabled image from the memory card when the recording medium detecting unit detects the memory card.

7. The scientific electronic calculating apparatus according to claim 1, wherein the function-disabled image display control unit controls the display unit to display the function-disabled image again, when a disabled function is selected for use via the function-selecting menu screen.

8. The scientific electronic calculating apparatus according to claim 1, wherein the function disabling information is recorded on the recording medium by an external information apparatus.

9. The scientific electronic calculating apparatus according to claim 1, wherein the function-disabled image is created by a user using an external information apparatus.

10. A non-transitory computer readable recording medium having a computer program stored thereon that is executable by a computer provided in a scientific electronic calculating apparatus which comprises a display unit and a recording medium receiving unit for receiving a recording medium, wherein the program is executable by the computer to control the scientific electronic calculating apparatus to perform functions comprising:
controlling the display unit to display a function-selecting menu screen for selecting a function to be executed from among a plurality of calculating functions executable by the scientific electronic calculating apparatus;
reading out (i) function disabling information for disabling at least one of the plurality of calculating functions and (ii) a function-disabled image, from the recording medium received in the recording medium receiving unit;
controlling the display unit to display the read out function-disabled image, when at least one of the plurality of calculating functions is to be disabled based on the read out function disabling information;

at least one function of the plurality of calculating functions based on the read out function disabling information; and controlling the display unit to display, on the function-selecting menu screen, a mark indicating the at least one disabled function as a disabled function among the plurality of calculating functions, after the function-disabled image is displayed.

11. The computer readable recording medium according to claim 10, wherein the function-disabled image is created by a user using an external information apparatus.

12. An electronic apparatus having multiple functions, the apparatus comprising:
   a display unit;
   a recording medium receiving unit for receiving a recording medium;
   a reading unit for reading out (i) function disabling information for disabling at least one of the functions of the electronic apparatus and (ii) a function-disabled image, from the recording medium received in the recording medium receiving unit;
   a function disabling unit for disabling at least one function of the multiple functions of the electronic apparatus based on the function disabling information read out by the reading unit; and
   a display control unit for controlling the display unit to display the function-disabled image read out by the reading unit, to indicate that at least one of the functions of the electronic apparatus is disabled, when at least one function is disabled by the function disabling unit.

13. The electronic apparatus according to claim 12, wherein reading unit reads out function disabling time information that defines a time period during which the at least one function is to be disabled, from the recording medium received in the recording medium receiving unit; and
   wherein the function disabling unit disables the at least one function for the time period defined by the function disabling time information.

14. The electronic apparatus according to claim 13, further comprising:
   a time counting unit for counting a time remaining during which the at least one function is to be kept disabled by the function disabling unit, based on the function disabling time information; and
   a time display control unit for controlling the display unit to display the time counted by the time counting unit.

15. The electronic apparatus according to claim 12, wherein the reading unit reads out a plurality of function-disabled images from the recording medium; and
   wherein the display control unit controls the display unit to display a preselected one of the plurality of function-disabled images, when at least one function is disabled by the function disabling unit.

16. The electronic apparatus according to claim 12, further comprising:
   a protected information storing area configured such that data on the information storing area cannot be erased by a user of the electronic apparatus; and
   a record control unit for storing the function disabling information and the function-disabled image read out by the reading unit in the protected information storing area;
   wherein the function disabling unit disables the at least one function based on the information stored in the protected information storing area.

17. The electronic apparatus according to claim 12, wherein the recording medium is a memory card; and
   wherein the electronic apparatus further comprises:
      a recording medium detecting unit for detecting the memory card received by the recording medium receiving unit;
      wherein the reading unit reads out the function disabling information and the function-disabled image from the memory card when the recording medium detecting unit detects the memory card.

18. The electronic apparatus according to claim 12, wherein the display control unit controls the display unit to display the function-disabled image again, when a user selects a disabled function for use.

19. The electronic apparatus according to claim 12, wherein the function disabling information is recorded on the recording medium by an external information apparatus.

20. The electronic apparatus according to claim 12, wherein the function-disabled image is created by a user using an external information apparatus.

* * * * *